United States Patent [19]

Munson et al.

[11] Patent Number: 4,829,779
[45] Date of Patent: May 16, 1989

[54] INTERFACE ADAPTER FOR INTERFACING A REMOTE CONTROLLER WITH COMMERCIAL REFRIGERATION AND ENVIRONMENTAL CONTROL SYSTEMS

[75] Inventors: Arden L. Munson, Oakland; Joseph C. Gruber, Hazelwood, both of Mo.

[73] Assignee: Hussmann Corporation, Bridgeton, Mo.

[21] Appl. No.: 133,370

[22] Filed: Dec. 15, 1987

[51] Int. Cl.$^4$ .............................................. F25B 7/00
[52] U.S. Cl. ...................................... 62/175; 236/51; 340/870.17
[58] Field of Search ........................... 236/51; 62/175; 364/551; 165/22; 340/585, 870.17

[56] References Cited

U.S. PATENT DOCUMENTS

| | | | |
|---|---|---|---|
| 3,343,132 | 9/1967 | Hanson et al. | 340/172.5 |
| 3,423,454 | 11/1968 | Frankel | 235/176 |
| 3,513,662 | 5/1970 | Golber | 62/115 |
| 3,628,904 | 12/1971 | Canguilhem | 444/1 |
| 3,707,080 | 12/1972 | Moreland | 62/233 |
| 3,813,533 | 5/1974 | Cone et al. | 235/155 |
| 3,871,443 | 3/1975 | Jones | 165/11 |
| 4,206,612 | 6/1980 | Gardner | 62/128 |
| 4,272,012 | 6/1981 | Molnar et al. | 236/1 |
| 4,287,939 | 9/1981 | Pohl et al. | 236/51 X |
| 4,333,519 | 6/1982 | Shafrir et al. | 165/12 |
| 4,413,672 | 11/1983 | Sidebottom | 236/51 X |
| 4,441,545 | 4/1984 | Alley et al. | 236/51 X |
| 4,500,034 | 2/1985 | Reese et al. | 236/49 |
| 4,537,038 | 8/1985 | Alsenz et al. | 62/118 |
| 4,553,400 | 11/1985 | Branz | 62/127 |
| 4,578,959 | 4/1986 | Alsenz | 62/140 |
| 4,581,901 | 4/1986 | Adams et al. | 62/234 |
| 4,593,533 | 6/1986 | Alsenz | 62/140 |
| 4,594,858 | 6/1986 | Shaw | 62/175 |
| 4,598,556 | 7/1986 | Mokadam | 62/117 |
| 4,602,484 | 7/1986 | Bendikson | 62/158 |
| 4,608,833 | 9/1986 | Kountz | 62/228.1 |
| 4,612,775 | 9/1986 | Branz et al. | 62/126 |
| 4,612,776 | 9/1986 | Alsenz | 62/175 |
| 4,614,089 | 9/1986 | Dorsey | 62/158 |
| 4,617,804 | 10/1986 | Fukushima et al. | 62/212 |
| 4,621,502 | 11/1986 | Ibrahim et al. | 62/223 |
| 4,628,700 | 12/1986 | Alsenz | 62/152 |
| 4,673,127 | 6/1987 | Grant | 236/5 |

OTHER PUBLICATIONS

U90 Schematic; 10/19/81.
Hussmann Catalog Nos. 922.1, 922.2, 930.5 and 934.3.
Hussmann Ultronic 90 Electronic Compressor Control Catalog 934.1.
Field Wiring Ultronic 90 to Plus System.
Hussmann Refrigeration Sales Bulletin 2648; 6/15/84.
Ultronic 90 Installation Instructions Bulletin 334.1; 8/82.
Hussman Refrigeration Sales Bulletin 6905; 4/19/85.
Ultronic 90 EX Price Sheet 634; 2/16/85.
Hussmann Refrigeration Sales Bulletin 6839; 5/10/84.

Primary Examiner—William E. Wayner
Attorney, Agent, or Firm—Richard G. Heywood

[57] ABSTRACT

An interface adapter for use in combination with a commercial installation having a central refrigeration system with multiple compressors and refrigerated units and also having environmental apparatus for regulating the heating, ventilating and air conditioning of such installation. The refrigeration system has a local control apparatus for operating the system in response to local status signals and has remote control input ports for remote control of the system. A remote electronic controller adapted to receive the local status signals and to override at least part of said local control means operates the refrigeration system by generating an electrical control signal and a switchback signal indicating that the electrical control signal should be recognized. The interface adapter electronically isolates and interfaces the refrigeration system and the remote controller. The interface adapter includes a circuit responsive to the switchback signal for providing the electrical control signal of the remote controller with the remote input ports of the refrigeration system. The interface adapter may also include a circuit for providing at least one of the local status signals to the remote controller. As a result, the interface adapter permits a corresponding control signal to be provided to the remote control input port of the system even though the electrical characteristics of the remote control input port may be incompatible with one of the corresponding electrical characteristics of the control signal.

26 Claims, 5 Drawing Sheets

INTERFACE ADAPTER FOR INTERFACING A REMOTE CONTROLLER WITH COMMERCIAL REFRIGERATION AND ENVIRONMENTAL CONTROL SYSTEMS

This invention relates generally to the refrigeration and environmental control arts, and more particularly to an interface adapter for interconnecting a remote controller with a refrigeration or environmental control system having local control apparatus for operating the system components.

BACKGROUND OF THE INVENTION

Commercial refrigeration systems are used, for example, to provide the large refrigeration requirements in a supermarket installation. Industrial refrigeration systems are used, for example, for operation in refrigerated warehousing, ice plants and like installations. Environmental control systems are used, for example, for effecting the space air heating, ventilating and air conditioning in various commercial and industrial installations. These systems include local electrical or electromechanical control apparatus for operating the system components. In commercial and industrial refrigeration systems, the local control apparatus senses temperature and pressure, compressor oil levels, condensing requirements, evaporator defrost needs and the like component operating conditions. The local control apparatus operates the controlled system components in response to such sensed conditions to provide efficient refrigeration while also providing safety features to compensate for compressor overloading, high and low pressure limits, low oil levels, etc. In environmental control systems, the local control apparatus senses temperature and humidity conditions and operates the controlled heating, air conditioning and/or ventilating components to provide optimum comfort levels and the like.

There is now a proliferation of electronic remote controllers available for connection with such commercial and industrial refrigeration and/or environmental control systems. Such remote controllers are generally part of an energy management system, which operates the entire controlled system and separate system components thereof according to environmental and/or other external parameters in order to use the system in the most efficient manner with minimum power usage. Frequently, such remote controllers are designed to operate several systems in a coordinated manner in order to achieve a particular, desired result. For instance, a remote controller having a microprocessor may be programmed to operate all refrigeration systems in a supermarket installation, and also efficiently operate the environmental air handler package containing heating and air conditioning for controlling the temperature and humidity of the store's space air.

Heretofore, the remote electrical controller most frequently has been incompatible with the local control apparatus and/or the external control ports of the system components, such as compressors, condenser fans, etc. This incompatibility may be the result of a local control and controlled system which is made by a different manufacturer than the remote electrical controller. For example, the inputs which are used to control the compressor motors of a refrigeration system may have different electrical characteristics than the outputs of the remote controller.

Additionally, the remote controller is, in many cases, connected directly in series with the local control apparatus and may override or inhibit safety limit circuits incorporated in the local control apparatus for protection of the equipment, such as motor compressor overheating and high pressure limit cutout. Such connection of the remote controller to the local control apparatus will affect the safety or limit circuits and negate their intended safety purpose. For safety reasons, the remote controller should be electrically isolated from the local control apparatus. This isolation is required so that the local control apparatus may operate as a self-contained unit or operate under the primary control of the remote controller without an interconnection between the respective power systems of the local control apparatus and the remote controller. Remote controller operation must also be accomplished with the failsafe condition of control by the local control apparatus. Thus, in the event of remote controller failure, the local apparatus must be able to take back control of the system from the remote controller in order to insure the reliable and safe operation of the controlled system while preventing simultaneous control by the remote and the local controllers.

It is now recognized that the remote controller should be provided with monitoring signals to verify and execute its control routine. For example, the compressor status (on or off) must be communicated to the remote controller in order that the remote controller can verify that there is an appropriate response by the refrigeration or air conditioning system which it is operating.

U.S. Pat. No. 3,871,443 to Jones describes a safety control for a remote control system. The remote system turns a zone heating and cooling air conditioning system unit on and off from a central control point. A safety freeze control system simultaneously switches the unit from a normal operating mode to a heating mode at a predetermined temperature and overrides the remote control system. The remote control of Jones, as with the other prior art, does not monitor the local unit and does not permit comprehensive remote control over the local unit in substitution for local control.

U.S. Pat. No. 4,206,612 to Gardner discloses a refrigeration system control. The system contains a compressor supplying refrigerant to several evaporators that are independently operated. Each evaporator has separate controls connected to a master control which prevents all of the evaporators from being defrosted at one time. Among other missing features, no switchback or isolation is suggested.

U.S. Pat. No. 4,272,012 to Molnar et al. describes a method and system for controlling a plurality of temperature conditioning units. The units are sequentially enabled and disabled. A setback feature which can be overridden by a thermostatic control is provided for off hours. An interface with monitoring and isolation is not discussed.

U.S. Pat. No. 4,333,519 to Shafrir et al. shows a controller for air conditioning units. A switch connects the unit to its energy source. In a first mode, the switch interrupts the connection; in a second mode the connection is uninterrupted. A control operates the switch in response to various conditions. However, no switchback or remote control is proposed.

SUMMARY OF THE INVENTION

The invention relates to an interface adapter for use with a remote controller which generates a control signal and a command signal indicating that the control signal should be recognized. The interface adapter interfaces the remote controller with a refrigeration or environmental control wherein the system has remote control input ports incompatible with the control signal. The adapter according to the invention includes first means for receiving the command signal, and second means responsive to the first means for receiving the control signal. The second means provides the control signal to one of the remote control input ports of the controlled system component in by-pass relation to local control apparatus therefor.

Among the several objects of the invention may be noted the provision of an interface adapter that permits the connection of a remote controller to a refrigeration or environmental control system having a local control apparatus; the provision of such interface adapter which permits control inputs of the local control apparatus to be compatible with electric control signals from the remote controller; the provision of such an interface adapter with which the local control apparatus continues to control the safety circuits; the provision of such apparatus which requires the remote controller to request control prior to recognizing any control signals; the provision of such an interface adapter which isolates and prevents dual operation by the remote controller and local control apparatus; the provision of such interface adapter which permits the local control apparatus to function as an self-contained unit when the remote controller does not request control; the provision of an apparatus for interfacing remote controllers with heating, ventilating and/or air conditioning and refrigeration equipment in a safe and reliable manner; the provision of such an interface for providing monitored information from the system equipment to the remote controller; the provision of such an interface for providing complete electrical isolation between the system equipment and the remote controller; and the provision of such adapter which permits monitor outputs of the system to be connected to the remote controller for monitoring.

Other objects and features will be in part apparent and in part pointed out hereinafter.

BRIEF DESCRIPTION OF THE DRAWINGS

In the accompanying drawings, wherein like reference numerals refer to like parts wherever they occur.

DETAILED DESCRIPTION OF PREFERRED EMBODIMENTS

For disclosure purposes, an interface adapter 100 embodying the present invention is disclosed for interfacing an energy management system (EMS) or remote controller 102 with the operative system components of a commercial refrigeration system 104 having a multi-compressor rack of compressors 106–110 for providing the normal or low temperature refrigeration requirements of a supermarket installation. In addition to such compressors, other basic components (not shown) of such a system include: an outdoor or roof-mounted condenser assembly with multiple fans, a rack-mounted receiver, a large number of refrigerated display and storage fixtures located throughout the installation, an oil system for the compressors, a defrost system for the fixture evaporators, receiver refrigerant level piping and a variety of valves. The operation of these various components is traditionally controlled by local control apparatus 112 in response to sensed internal temperature, pressure, oil level, refrigerant level, frosting and other conditions and/or sensed external conditions, such as ambient temperature and store space air temperature and humidity. Such local control apparatus 112 is shown in diagrammatic form because its construction varies widely, but various forms and their operation are well known to those skilled in the art.

With reference to the compressors 106–110 as being representative of system components operated by local control apparatus, the compressor motors are cyclically turned on and off to maintain suction pressure in the system within a preselected range and to operate the compressors within a high-low head pressure range. The local control apparatus 112 thus provides safety features in setting high pressure limits and preventing compressor overload.

With the advanced technology of sophisticated, computer programmed, master remote controllers, the overall operation of a controlled refrigeration or environment control system can be controlled in a most efficient manner with substantial power savings. However, it is recognized that the refrigeration system cannot be operated simultaneously by both a local control apparatus 112 and a remote controller 102, and that there is a need to interface the remote controller 102 with the system components in a compatible and efficient relationship, and without sacrificing the safety features afforded by the local control apparatus.

Figure 1:
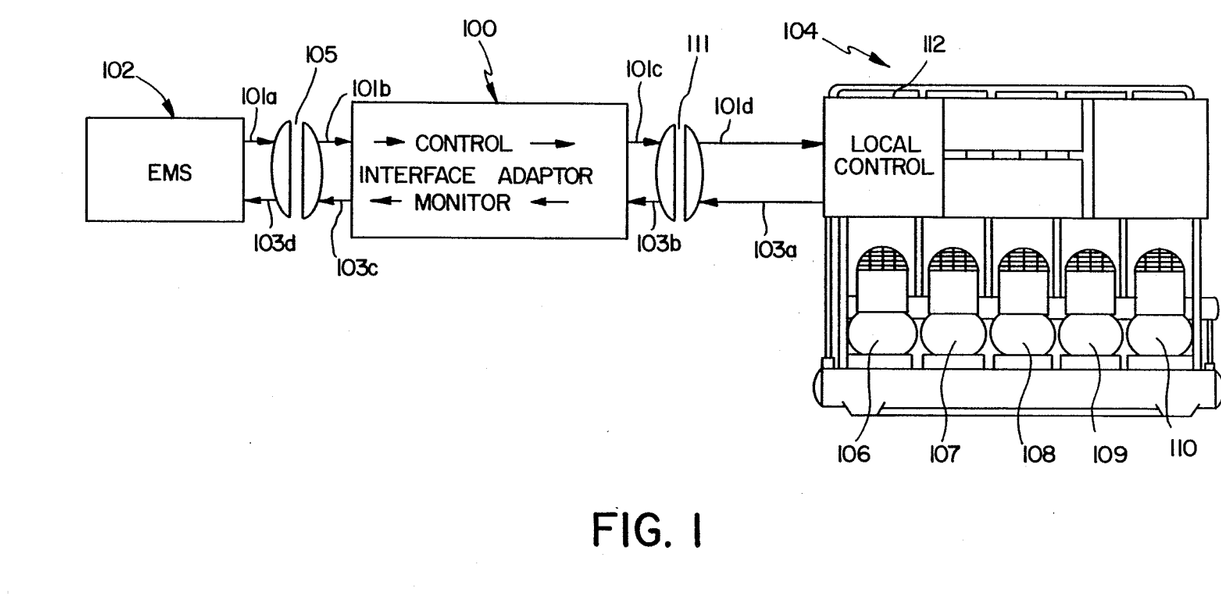
FIG. 1 is a diagrammatic view showing the interface adapter of the present invention connected between a remote controller and a local control apparatus for a refrigeration system.

The interface adapter 100 according to the invention is illustrated in block diagram form in FIG. 1, and comprises control input ports 101b for receiving control and command signals from output ports 101a of the energy management system (EMS) or remote controller 102. Control input ports 101b are isolated from the control input ports 101d to the components of system 104 by use of a relay structure described in detail herein. Input ports 101d are connected to output ports 101c of interface 100 and are provided with signals corresponding to the remote control signals provided by control output ports 101a. Status output ports 103a from the system components provide monitoring signals, such as status of system components or sensed data pertaining thereto, to input port 103b of interface adapter 100. These monitoring signals are passed along through the interface 100 to the status input ports 103d of remote controller 102 via output ports 103c of interface 100. Status output ports 103a may be isolated from status input ports 103d by use of the relay structure described herein. Any number of isolated circuits for input into the interface adapter 100 from remote controller 102 or for status output from the system 104 into the interface adapter 100 may be used. Connection to the adapter 100 is through a multiple circuit connector/cable 105, 111.

The interface adapter 100 according to the invention has particular application in installations where the electrical characteristics of the control output signals provided by remote controller 102 through output ports 101a do not match the logic or electrical characteristics of the control input ports 101d to the controlled components of the system 104; and/or where the electrical characteristics of the monitor signals from the system 104 provided through status output ports 103a do not match the electrical characteristics of the status or monitoring input ports 103d of the adapter 100. For example, it may be necessary or desirable to operate a refrigeration system of one manufacturer with a remote controller of a different manufacturer. Thus, the separate compressors 106–110 of system 104 would include electro-mechanical motor and/or capacity controls for normal operation. However, it may be desirable to control system 104 as part of an integrated refrigeration network or in coordination with an energy management system 102 also effecting an environmental control system (not shown). System 104 would normally include a plurality of control input ports 101d which are compatible with the same manufacturer's remote controller. The signals from these remote ports override or work in conjunction with the mechanical controls. However, not all controllers or energy management systems provide control signals with electrical characteristics compatible with different manufacturers' systems and, to overcome this incompatibility, an interface adapter 100 embodying the invention may be used. Such characteristics include voltage, current, power, format and duration.

Figure 2:
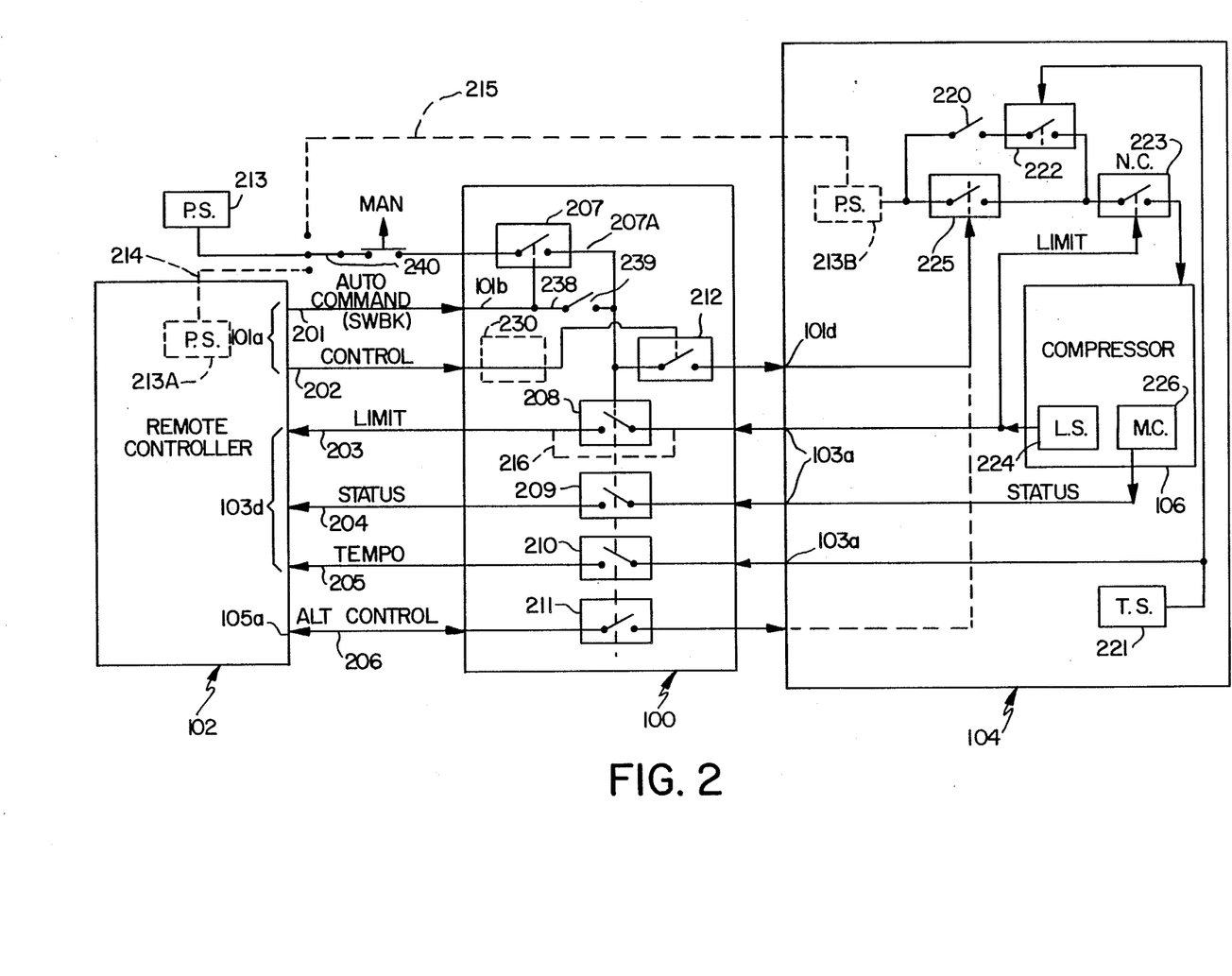
FIG. 2 is a circuit diagram illustrating one preferred alternative embodiment of the adapter of FIG. 1.

FIG. 2 illustrates one preferred embodiment of the invention wherein one compressor 106 of the system 104 is shown, and interface adapter 100 is located between compressor 106 and remote controller 102. Remote controller 102 has output ports 101a for providing a switchback or command signal 201 and a control signal 202. Remote controller 102 may also have monitor or status input ports 103d for receiving a limit signal 203 as for indicating high or low side compressor pressure, a status signal 204 as for indicating that the compressor 106 is on or off, and/or a temperature signal 205 as for indicating the temperature of the system. Alternatively, remote controller 102 may have an output port 105a as for providing an alternate or dedicated control signal 206.

Switchback or command signal 201 is the signal provided by the remote controller 102 to indicate that it is seizing control of system 104. Command signal 201 is provided to control input port 101b for connection to the coil or control of a primary or switchback relay 207. The primary relay 207 is connected to energize (enable) other ganged relays 208, 209, 210 and 211 of the interface 100. The power signal output 207a of relay 207 may also be provided as a control signal through relay 212. Relay 207 comprises means for receiving the command signal 201 and for providing a power signal 207a in response thereto. An external power source 213 may be any standard power source for providing power to energize the relay coils of the interface adapter 100. Alternatively, such power for the interface adapter may be tapped from the internal power source 213A of the remote controller 102 via line 214 or from the internal power source 213B of the system 104 via line 215. Alternatively, command signal may be directly provided to energize the other ganged relays 208–211 via line 238 and switch 239. In another alternative form, switch 240 may be employed to selectively connect a power source 213, 213A, or 213B for providing power through relay 207.

The control signal 202 provided by the output port 101a of remote controller 102 may or may not be compatible with the input port 101d of the system 104 for receiving the control signal. In the event that the control signal 202 is incompatible, a corresponding, compatible signal such as command signal 201 may be provided via power supply 213, or some other power supply, and routed through relay 212. Relay 212 is then energized by the control signal 202 from remote controller 102 to pass the compatible signal. Alternatively, the frequency, phase, amplitude and/or any other parameter of control signal 202 may be reconfigured by any circuit 230, well known in the art, in order to energize relay 212 or in order to be compatible with the input port 101d of system 104.

In the event that control signal 202 is compatible or has been reconfigured to be compatible with the input port of system 104, a circuit configuration as illustrated with respect to alternate control signal 206 may be used. In this case, relay 211 is energized by the command signal 201 via relay 207. Relay 211 passes the alternate control signal 206 to the input port of system 104.

System 104 also has several status output ports 103a for providing various monitor signals which may be necessary for the remote controller 102 to properly control system 104. If these monitor signals are compatible with the monitor input ports of remote controller 102, the signals may be directly provided as indicated by dotted line 216. Alternatively, if isolation is necessary between the monitor output ports 103a of system 104 and the monitor input ports 103d into remote controller 102, the relays 208, 209 and 210 (energized via the command signal 201 to relay 207) may be used to transfer the monitoring signals during periods when the remote controller is providing a command signal and has seized control of the system 104. Also, the monitoring signals may be reconfigured or replaced in the interface adapter 100 by other signals which would be compatible with the monitoring input ports of remote controller 102, if such is necessary.

During local operation of system 104, compressor 106 is operated according to the mechanical internal local control apparatus of system 104. By closing manual system switch 220, system 104 is activated. Temperature sensor (T.S.) 221, such as a thermocouple, senses the temperature of the system evaporator or space zone to be cooled. When the temperature goes above the preset temperature, temperature sensor 221 activates and closes relay 222 to provide power through normally closed relay 223 to activate the compressor 106.

In the event that limit sensor 224 of the compressor 106 senses that a system limit has been exceeded, a limit sensor signal is provided to activate normally closed (N.C.) relay 223 thereby opening the relay and preventing power from being provided to compressor 106.

When remote controller 102 is ready to take control of system 104, it provides command signal 201 and control signal 202. Command signal 201 activates relay 207 so that the control signal 202 activates relay 212 or the alternate control signal is passed via relay 211. This results in activation of relay 225 which closes and provides power through relay 223 to the compressor 106. Relay 225 is part of system 104 and provides the input port 101d for remote control operation of system 104. Simultaneously, remote controller 102 is constantly receiving monitored temperature signals 205 from temperature sensor 221 via relay 210 of the interface 100. When remote controller determines that the appropriate temperature has been reached, control signal 202 is withdrawn thereby opening relay 212 and relay 225 disrupting power and stopping the compressor 106 or, alternatively, starting the compressor when the temperature increases to a preselected level. During operation, remote controller 102 is also receiving status signal 204 via, for example, the motor contacts 226 of compressor 106. This status signal allows the remote controller 102 to verify that the compressor 106 is operational during periods that a control signal 202 therefor is being provided.

Remote controller 102 also receives a monitoring limit signal 203 such as a signal indicating a pressure or fluid level via relay 208 which indicates that a system limit has been exceeded and that the compressor 106 has been shut down by limit relay 223. In such an event, the remote controller 102 generally will give up control of the system 104 by withdrawing the command signal 201 since this may involve a locally controlled safety limit feature of the system 104.

Figure 3A:
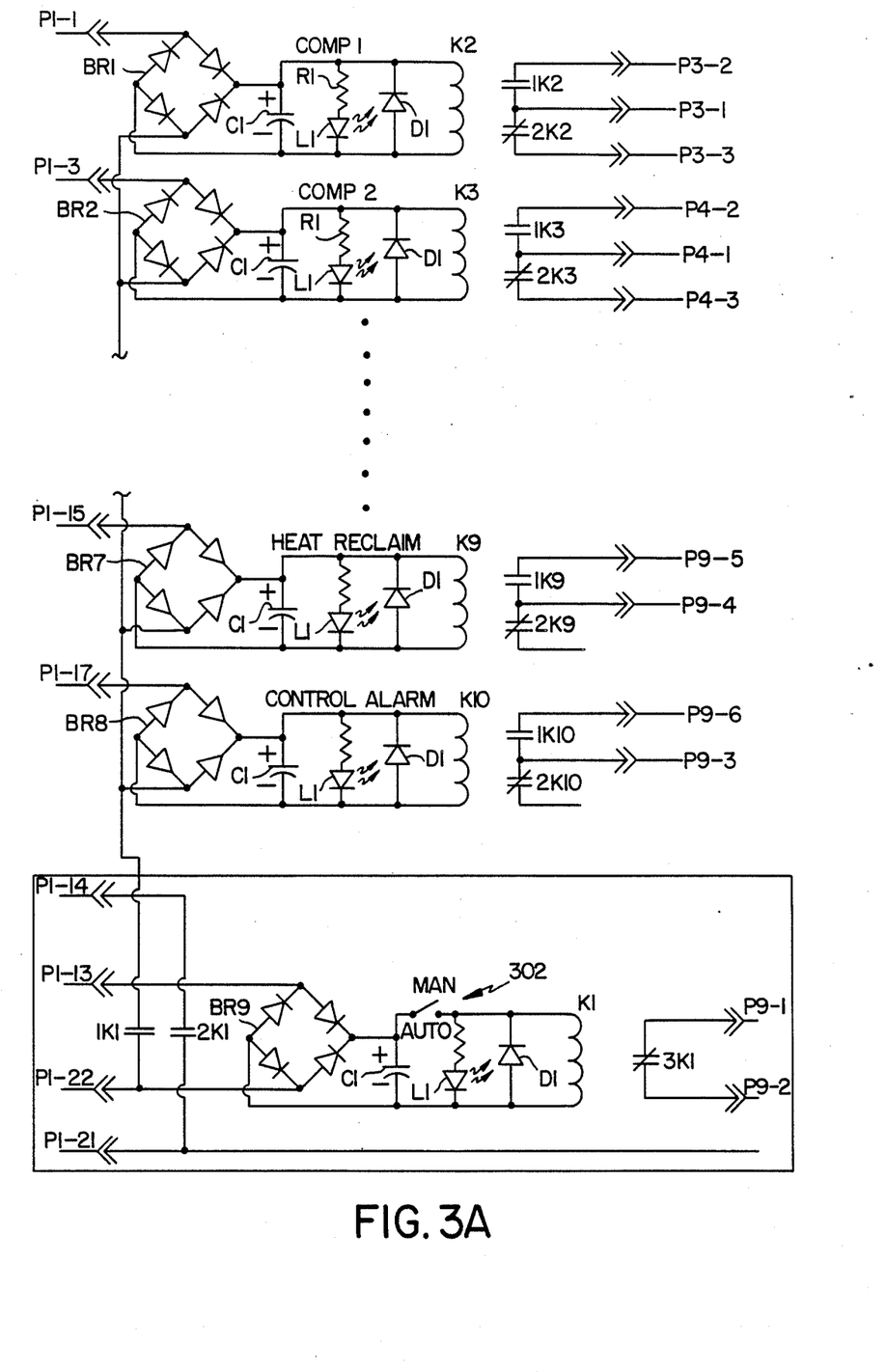
FIGS. 3a and 3b are schematics of a second preferred alternative embodiment of the adapter of FIG. 1 including bridge rectifier circuits for receiving from the remote controller.
Figure 3B:
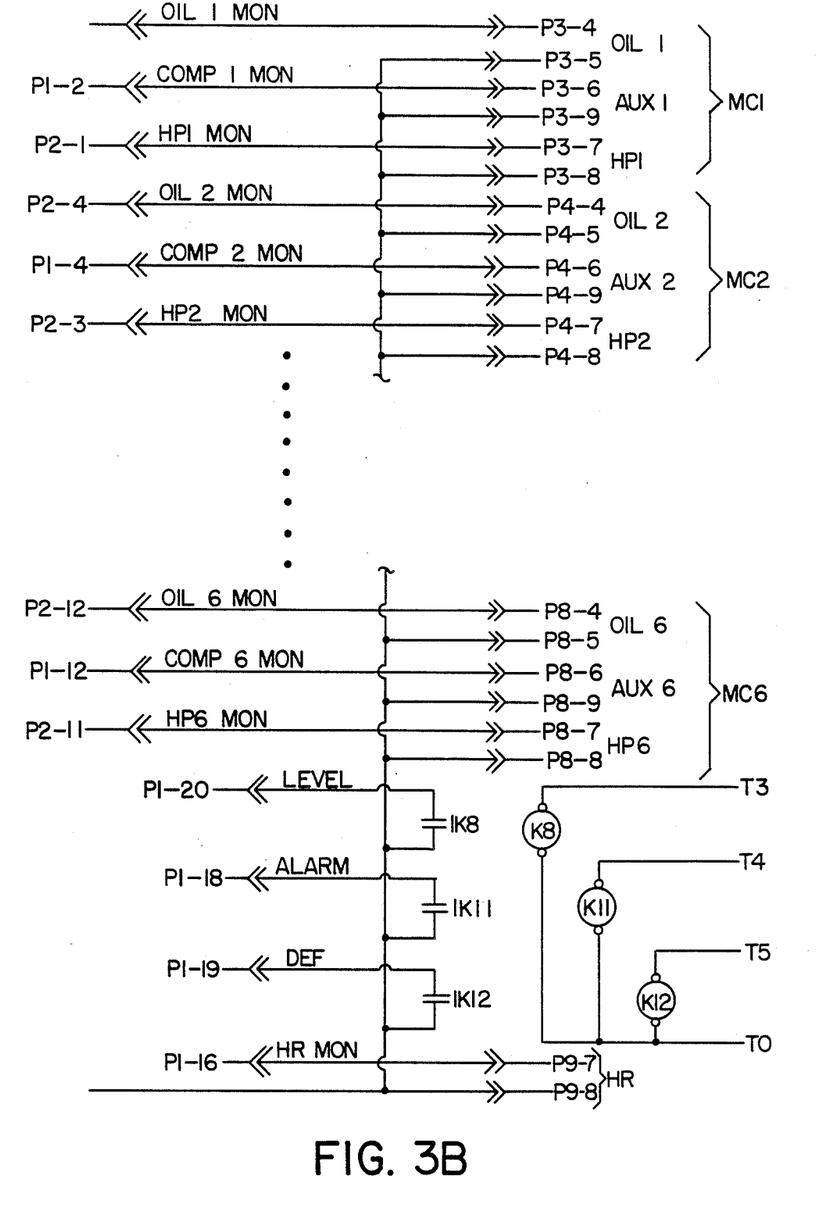

Referring now to FIG. 3, bridge rectified circuits BR1–BR9 are used for all control input circuits 101b to the interface 100. The bridge rectifier makes the input universal to either a 24 volt A.C. or D.C. signal. The only limit to the input circuit is a voltage maximum and a minimum drive current.

The first point of isolation is the command or switchback circuit 300. This circuit is comprised of a relay K1 having normally open (N.O.) contacts 1K1 and 2K1 and normally closed (N.C.) contacts 3K1 and a bridge rectifier BR9. The input to the relay is through the diode bridge rectifier BR9. This bridge rectifier BR9 permits either an A.C. or D.C. signal to be used to energize the relay. Normally open (N.O.) contact 1K1 on the switchback relay K1 is in series with relays K2–K12 and provides the common connection via line 301 for energizing the coil circuits of the other input relays K2–K12.

In operation, a remote control device 102 would be connected to pins P1-13 and P1-22 to activate the switchback relay K1 seizing control of the heating, ventilating or air conditioning and refrigeration equipment. Upon activation of relay K1, N.O. contact 1K1 is closed and provides a common connection to each of the rectifier bridges BR1–BR9 so that control ports P1-1, P1-3, P1-5, P1-7, P1-9, P1-11, P1-13, P1-15, and P1-17 are ready to receive input control signals from controller 102. The remote control device 102 selectively applies signals to these ports to activate the input relays K2–K7, K9 and K10. As a result, the relays open and/or close contacts to activate various control circuits of the refrigeration system 104 or the heating, ventilating or air conditioning of an environmental control system (not shown). As the system 104 operates, it would provide various monitor signals back to the remote controller by a change of status of an isolated contact or sensor in the system. Finally, the remote controller 102 could release control by deactivating the switchback relay K1. This would return direct control of the refrigeration or environmental control equipment to local controllers therefor. This will insure continued failsafe operation of the equipment.

Upon activation, switchback relay K1 also closes N.O. contacts 2K1 which is connected between common pin P1-21 and pin P1-14 which are connected back to the remote controller 102. Contact 2K1 is a monitor contact which indicates to the remote controller 102 that switchback circuit 300 has been activated and which verifies that the switchback relay K1 is operational and that interface 100 has seized control of the system 104. Activation of relay K1 also opens N.C. contacts 3K1 which are connected between pins P9-1 and P9-2 which are connected back to the system 104. Contact 3K1 is a second monitor contact which indicates to the system that switchback circuit 300 has been activated and which verifies that the switchback relay K1 is operational and that remote controller 102 has seized control of the system. If switch 302 is manually opened to inhibit the controller from taking control of the system, the controller will be able to determine that switch 302 is open because contact 2K1 will not close or contact 3K1 will not open in response to a switchback signal.

An interface signal plug is located at the end of a communications cable (see FIG. 1, plug 105) extending from the interface 100. This 50 pin plug is provided for the installer to connect to the "vendor of choice" remote controller. The following outlines the input/output signal points corresponding to FIG. 3:

1. Inputs P1-1, P1-3, P1-5, P1-7, P1-9 and P1-11 to six compressors or unloaders (subsystems COMP 1-COMP 6) and input P1-15 to control the heat reclaim cycle.

2. An input P1-13 and P1-22 (common) to a master control relay K1 (switchback).

3. An input P1-17 to initiate a rack alarm.

4. An isolated group of monitoring circuits MC1–MC6 for each compressor (or unloader) and the heat reclaim (HR) function. Unloaders are not monitored directly; monitoring is done indirectly through the motor contactors. Input pin set P3-6, P3-9 from the motor contacts of compressor 1 (i.e., AUX 1) provide a signal at pin P1-2 for the controller thereby indicating to the controller that compressor 1 is operational. Monitoring of the oil failure control of compressor (i.e., OIL 1) is provided by connecting pin set P3-4 and P3-5 to the oil failure control contacts of compressor 1 and by connecting corresponding pin P2-2 to the controller 102. Monitoring of the high pressure limit of compressor 1 (i.e., HP 1) is provided by connecting pin set P3-7 and P3-8 to the high pressure limit contacts of compressor 1 and by connecting corresponding pin P2-1 to the controller. Similar circuitry with corresponding labeling is provided for compressors 2–6.

5. An input P1-15 so that remote controller 102 can initiate heat reclaim.

6. An output T5 from the rack (system) to drive relay K12 thereby closing contact 1K12 to provide a signal via input pin P1-19 connected into the remote controller 102 to indicate to the controller that a timed defrost cycle has begun in the refrigeration components of the system 104.

7. An output T3 to drive relay K8 closing contact 1K8 and providing a signal at pin P1-20 indicating to the controller that the rack receiver has a low refrigerant level.

8. An output T4 to drive relay K11 closing contact 1K11 and providing a signal at pin P1-18 indicating to the controller that a local malfunction alarm has been initiated.

9. An input P9-7 from the rack with corresponding output P1-16 to the controller to indicate that the system 104 is in a winter heat reclaim status.

A light emitting diode (LED) indicator L1 is connected in parallel (along with filtering capacitor C1, resistor R1, and polarizing diode D1) to each of the coils of relays K1–K7, K9, K10 to visually indicate to an operator that the relay is functioning and, therefore, a particular control is active. Each of these relays has a N.O. contact 1K and a N.C. contact 2K for connection to the system 104. For example, relay K2 has N.O. contact 1K2 and N.C. contact 2K2 connected to pins P3-1, P3-2, P3-3. The opening and/or closing of these contacts can be used to control the system 104. Alternatively, as illustrated in FIG. 2, pin P3-1 may be adapted to directly receive the control signal (by connecting P3-1 to P1-1) or to receive the command signal (by connecting P3-1 to P1-22). Similar circuitry with corresponding labeling is provided for the other relays. Terminals T1 and T2 may be connected to system 104 so that pins P1-23 and P1-24 provide 24VAC power, if necessary, to the remote controller 102.

The invention provides isolation between the remote controller 102 and the system 104. The relay configuration described herein does not permit an extraneous voltage from the system to pass through the interface 100 to the controller and prevents the controller from putting a damaging signal into the system. The invention incorporates positive logic operation. This means that (logic) turn on=(system) turn on. Oppositely, negative logic means that (logic) turn on=(system) turn off.

In the case of a vendor controller employing negative control logic, connection to interface 100 can still be accomplished, for example, at the software level by the controller manufacturer or by using a simple pull-up circuit (not shown). This arrangement requires pull-up resistors to be connected to the signal bus, pulling the lines up to a positive voltage.

Voltage input is specified as one of the following: 24VAC or DC, "12 or 5 VDC". Input voltage is selectable and polarity must be observed when driving with DC and other than bridge rectifier circuits are used to receive inputs from the remote controller 102.

The user must determine how many features of the interface 100 will be used. To access the interface, a standard plug such as an ITT Cannon type DDC-50P plug is required. The interface socket is attached to a fifty wire cable that hangs on the system rack.

Interface 100 is a device allowing a controller of any manufacturer which has the proper control parameters to send and receive signals to operate a refrigeration system of a different manufacturer. Interface 100 accepts low voltage and low current control signals from the remote controller 102 and then activates the appropriate interface control relays K1–K7, K9, K10. The contacts associated with these control relays are wired to the remote control input ports 101d of each compressor control circuit of system 104. Remote controller 102 is in a parallel (positive) scheme to the mechanical pressure controls (i.e., local control 112 of FIG. 1). Interface 100 capability includes full switchback, auxiliary monitoring such as monitoring an auxiliary contact to a motor controller, high pressure hot or desuperheated gas defrost, heat reclaim and refrigeration alarm monitoring. Other control inputs available are switchback control, control alarm, and heat reclaim.

Interface 100 permits remote control of all system 104 functions and maintains full electrical isolation between remote controller 102 and the local control apparatus of system 104. Remote monitoring of all system rack and other component functions is now possible. Interface 100 meets or exceeds UL requirements for separating or isolating controller 102 wiring from the control panel voltage of system 104.

Interface 100 is prewired such that the installer only needs to connect the extended cable to the vendor's remote controller 102. The pin connects are identified in an instruction manual and the installer need only identify the proper connect/pin position in the vendor controller mating plug for proper interfacing.

Failsafe controls are in parallel with any external control provided by remote controller 102, but are not active until switchback (command) is released. In the event of controller 102 failure, the system 104 control turns to failsafe backup on low pressure, mechanical controls. This is accomplished by effectively placing each low pressure control in parallel with the remote controller 102 by running the pressure control through the N.C. contacts of the interface control relay. When switchback relay 207 is de-energized system 104 applies power to the mechanical controls 112 of system 104 and compressor control (sequencing) is accomplished. This allows for either, but not both to operate.

Indicator lights L1, showing the compressor, heat reclaim, alarm and switchback status of the interface are on the circuit board located in the control panel. These are of primary use to the operator in troubleshooting. If there are no visual indicators on the vendor controller, an operator can observe indicators provided on the interface 100 for confirmation of controller operation.

In the event of loss of power to interface 100 or the vendor controller 102, the positive logic aspect discussed above assures the operation of system 104 by disabling the switchback relay K1 and returning control to the local controllers of system 104.

Figure 4:
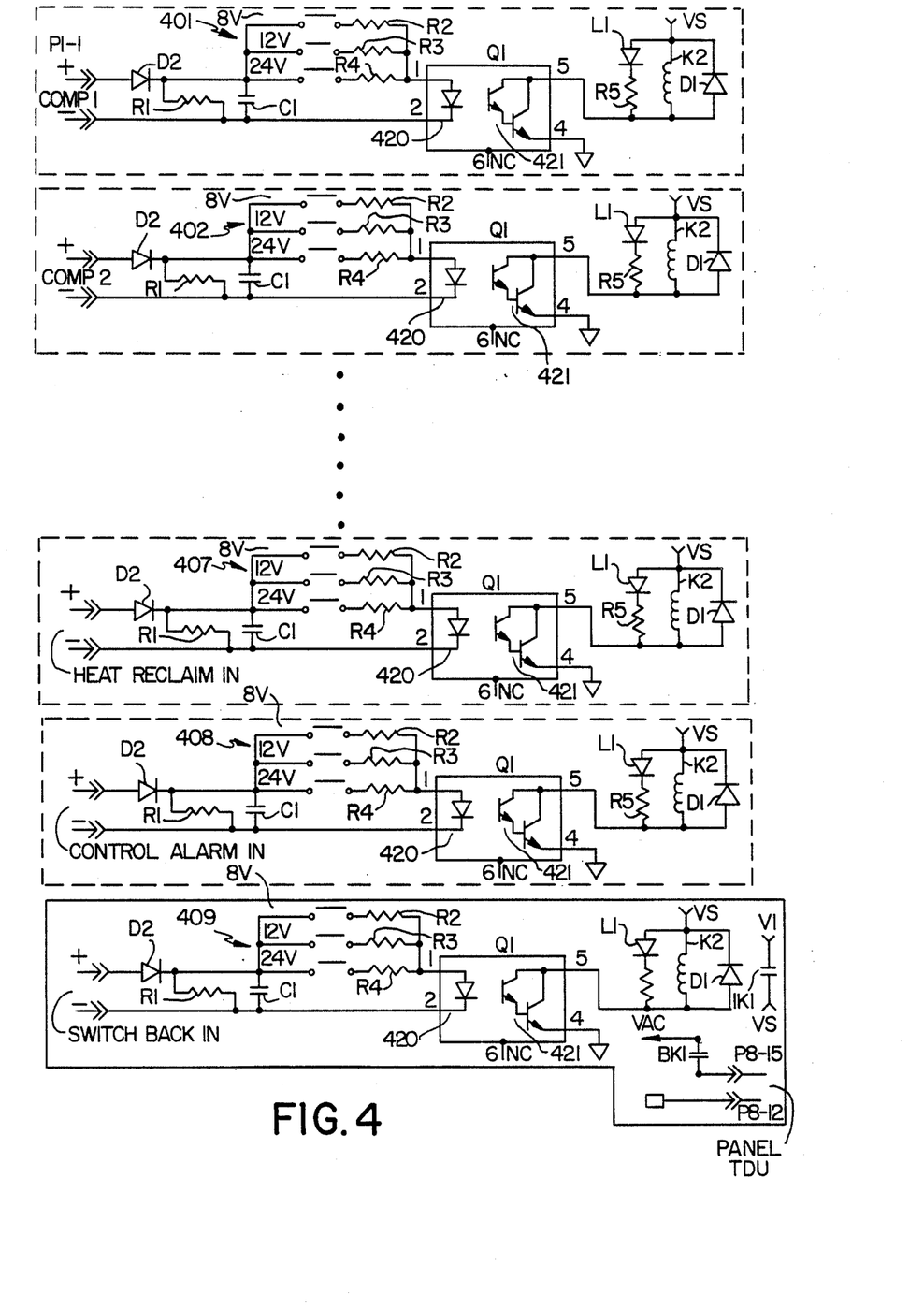
FIG. 4 is a schematic of a third preferred alternative embodiment of the adapter of FIG. 1 including opto-isolators for receiving signals from the remote controller.

FIG. 4 illustrates an alternative, preferred embodiment of the invention wherein optical isolators 401–409 are used in place of bridges BR1–BR9 of FIG. 3. The external remote controller 102 for system 104 should be capable of providing to interface adapter 100 compressor input terminal signals having a minimum of 3.0VDC at 3.6 mA to a maximum of 27VDC at 13.1 mA. The selectable input voltage to be provided to interface 100 by remote controller 102 is divided into three ranges: 5, 12 and 24 volts and is selected by use of a three position dual in-line package switch having a (DIP) shorting jumper which interconnects the positive input through the appropriate resistor (R2, R3 or R4) to terminal 1 of Darlington switch Q1. In the event that controller 102 provides a dc input voltage, the polarity must be known in order to properly drive the optical isolators 401–409. Polarity diode D2 protects each Darlington switch Q1. FIG. 4 illustrates the polarity for dc operation. Each input circuit also includes resistor R5 to protect LED L1.

Each Darlington switch Q1 includes a light emitting diode 420 connected across input terminals 1, 2. A Darlington amplifier pair 421 is connected across output terminals 5, 6. When a control signal is provided by controller 102 to the inputs of the switch Q1 (for example, input P1-1), the light emitting diode 420 is activated and is caused to glow through a quartz window to illuminate the gates of the Darlington amplifier pair 421. The gates of the amplifier pair are exposed and, therefore, light sensitive. Upon illumination, the gates become conductive and turn on the amplifier pair to interconnect terminals 4 and 5 and ground the one terminal of the coil of relay K2 which is connected to terminal 5 (terminal 4 is grounded). As a result, relay K2 is activated because B+ power ($V_1$, $F_s$) is already connected to the other terminal of the coil of relay K2 by contact 1K1 of switchback circuit 1K1. Of course, any optical switch may be used in place of switch Q1 such as a photoresistor in combination with a silicon controlled rectifier.

The jumper for each control relay is preset for the highest voltage, 24VAC or DC, which may be applied. The jumper can be removed and repositioned over another pair of pins in that DIP. The pins are to be selected according to the above mentioned ranges. The pins to be selected are identified on a legend on the interface board showing typical positions.

The 24V select is also suitable for 24VAC RMS operation in the event that a specific control is not capable of meeting the input voltage and current requirements. In this case, the control can use dry contacts to switch 24VAC from the supplied control transformer to switch input voltage to the interface inputs.

In the switchback operation, the coils of compressor control relays K2-K7 are activated. The switchback relay K1 assures that action by supplying power via contact 1K1 which connects the power supply voltage VS to V1 which powers each coil (K2-K7) of the interface control relays. The switchback relay K1 also powers the coils of relays K9 and K10.

A time delay relay may be provided as part of the interface 100 wiring to allow a factory preset period of time before the backup system takes control. The switchback relay K1 is an electrically held relay with N.O. contacts in series with the TDSB (time delay switchback) relay. The TDSB relay operation is delay on reverse. This means a defined period of time, set by the relay, will pass before the contacts will operate in the switchback state. At that time, the TDSB N.C. contacts operate. Pins P8-12 and P8-15 are connected to the panel time delay unit of the system 104 to provide power to the controller 102 via contacts 3K1.

The TDSB relay contacts will operate as follows: the N.C. contacts will close after switchback and allow power to flow to the compressors through the respective low pressure switches and to prevent remote controller 102 from seizing control before the preset time delay has expired. Another time delay relay with N.O. contacts may be used for sequencing compressors. The purpose is to provide some additional time delay after switchback so that not all compressors will operate at once if the low pressure switches are set closely or not at all.

An additional feature of the switchback relay is to assure that drop out of each interface compressor control relay K2-K7, K9 and K10 occurs through the switchback contacts. The switchback contacts operate within the interface such that each control relay coil must receive its power through them. Also, 24VAC power is supplied to the TDSB coil through the switchback contacts.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In combination with a commercial installation having a central refrigeration system with multiple compressors and refrigerated units and also having environmental apparatus for regulating the heating ventilating and air conditioning of such installation, said refrigeration system having local control means for operating said refrigeration system in response to local status signals and having remote control input ports for remote control of the refrigeration system; and a remote electronic controller adapted to receive the local status signals and to override at least part of said local control means and operate said refrigeration system by generating an electrical control signal and a switchback signal indicating that the electrical control signal should be recognized; the improvement comprising:

interface adapter means for electronically interfacing said refrigeration system and said remote controller including:

means responsive to the switchback signal for providing the electrical control signal of the remote controller with the remote input ports of the refrigeration system; and     means for providing at least one of the local status signals to the remote controller.

2. An improvement as set forth in claim 1 wherein the remote control input port is electrically incompatible with the control signal.

3. An improvement as set forth in claims 1 or 2 wherein said interface adapter means isolates the remote controller from the system.

4. An apparatus for interfacing between a system having a local control means for operating said system in response to a local status signal representing the status of said system and remote control means for overriding part or all of said local control means and for operating part or all of said system by generating an control signal and a command signal indicating that the control signal should be recognized, said apparatus comprising:

means for isolating the remote control means and the system including:

first means, responsive to the command signal, for providing a remote signal corresponding to the control signal to the system; and     second means for providing the local status signal to the remote control means.

5. The apparatus of claim 4 wherein said second means is responsive to the command signal.

6. The apparatus of claim 4 wherein said first means comprises command relay means, and control relay means, said command relay means, responsive to the command signal, for energizing the control relay means; and said control relay means, when energized by the command relay means, for providing the remote signal to the system.

7. The apparatus of claim 6 wherein said command relay means comprises a first relay having a first coil for closing first upper and first lower contacts, wherein said control relay comprises a second relay having a second coil for closing second upper and second lower contacts, and wherein said first upper contact is connected to a power supply, said first lower contact is connected to said second upper contact, said first coil is adapted to receive the command signal, said second lower contact is connected to the system and said second coil is adapted to receive the control signal whereby the command signal activates the first coil to close the first contacts and the control signal activates the second coil to close the second contacts thereby providing a power supply signal to the system.

8. The apparatus of claim 7 further including first rectifying means for rectifying the command signal and providing the command signal to the first coil and second rectifying means for rectifying the control signal and providing the rectified control signal to the second coil.

9. The apparatus of claim 7 further comprising energizing means for energizing said coils, a first optical switch, responsive to the command signal, for interconnecting said energizing means and said first coil and a second optical switch, responsive to the control signal, for interconnecting said energizing means and the second coil.

10. The apparatus of claim 7 further comprising means for selectively interconnecting the command signal to a biasing resistance and for selectively interconnecting the control signal to a biasing resistance.

11. The apparatus of claim 7 further comprising means for selectively enabling and disabling the energizing of the first coil.

12. The apparatus of claim 4 further comprising means for rectifying said command and control signals and for providing the rectified command and control signals to the first means.

13. An interface adapter for use with a remote controller which generates a control signal and a command signal indicating that the control signal should be recognized, and for interfacing said remote controller with a refrigeration or environmental system having air conditioning, wherein the system has at least one remote control input port for remote control thereof, the adapter comprising:
  first means for receiving the command signal and for providing a power signal in response thereto; and
  second means, responsive to said power signal, for receiving the control signal and for providing a corresponding control signal to the remote control input port only when the command signal is being received by the first means and the control signal is being received by the second means.

14. An adapter as set forth in claim 13 wherein at least one of the electrical characteristics of remote control input port is incompatible with one of the corresponding electrical characteristics of the control signal.

15. An adapter as set forth in claims 13 or 14 wherein the system includes an information monitoring output port providing a monitoring signal representing a status of the system and the remote controller has an input port for receiving the monitoring signal; and wherein the adapter further comprises means for connecting the information monitoring output port to the input port of the remote controller.

16. An adapter as set forth in claim 15 wherein the means for connecting is responsive to the first means and provides the monitoring signal to the input port only when the command signal is being received by the first means.

17. An adapter as set forth in claim 13 wherein the first means includes means for connecting an electrical line to a terminal of a power supply for providing the power signal only when the command signal is being received; wherein the remote controller generates a plurality of control signals; and wherein the adapter includes a plurality of relays, each having a contact connected to a corresponding remote control input of the system and a plurality of energizing means, each energizing means being responsive to a corresponding one of the control signals to energize the associated relay only when the electrical line is connected to the terminal of the power supply.

18. An adapter as set forth in claim 17 wherein each said relay has a coil and the energizing means includes a rectifier for receiving the control signal to produce a rectified signal to energize the coil of the associated relay.

19. An adapter as set forth in claim 17 wherein the energizing means includes an isolation device for receiving the control signal at an input and for producing, in response to the control signal, an isolated conduction path between a pair of output terminals.

20. An adapter as set forth in claim 19 wherein the input of the isolation device includes a plurality of biasing resistances for connection to the input of the isolation device and means for connecting one of the resistances to control the current through the input.

21. An adapter as set forth in claim 17 wherein the energizing means includes an optical switch for receiving the control signal and for energizing the relay in response thereto.

22. An adapter as set forth in claim 13 wherein the second means includes control ports receiving the control signals and an enable port receiving the command signal for selectively enabling and disabling the control inputs and wherein the first means includes a contact for connection to the enable port thereby to permit the remote control apparatus to control the system only when the command signal is present.

23. An adapter as set forth in claim 13 wherein the first means includes a manual switch for selectively enabling and disabling the receiving of the command signal.

24. An interface adapter for use with a remote controller which generates a control signal at its control output port and a switchback signal at its switchback output port indicating that the control signal should be recognized, and for interfacing said remote controller with a heating, ventilating, refrigerating or environmental system having air conditioning, wherein the system has a remote control input port for remote control thereof, the adapter comprising:
  a first relay having a first coil which when energized, operates to interconnect a first contact and a second contact of the first relay, the first contact connected to the remote control input port of the system and the second contact connected to the control output port of the apparatus;
  a second relay having a second coil which, when energized, operates to interconnect a first contact and a second contact of the second relay, the first contact connected to the first coil and the second contact connected to a power supply for energizing the first coil;
  means responsive to the switchback signal for energizing the second coil thereby energizing the first coil and providing the control signal via the first and second contacts of the first relay to the remote control input port of the system.

25. An adapter as set forth in claim 24 wherein the remote control input port of the system is electrically incompatible with the control signal.

26. An adapter as set forth in claims 24 or 25 wherein the system includes an information monitoring output port providing a monitoring signal representing a status of the system and the remote controller has an input port for receiving the monitoring signal; and wherein the adapter further comprises means for connecting the information monitoring output port to the input port of the remote controller.

* * * * *